July 24, 1962
A. DUNGAN
3,045,348
MEAT TENDERIZER
Filed Oct. 5, 1960
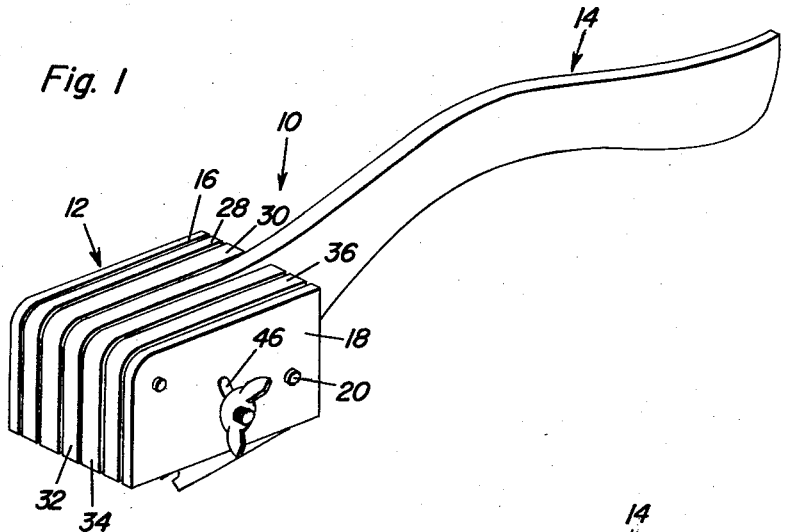
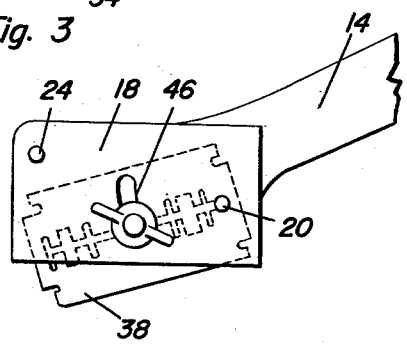
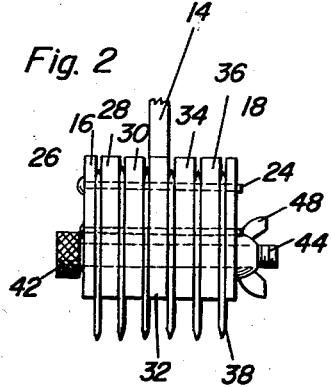
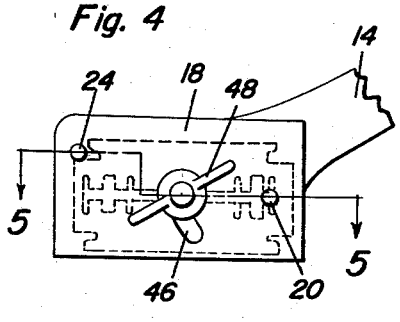
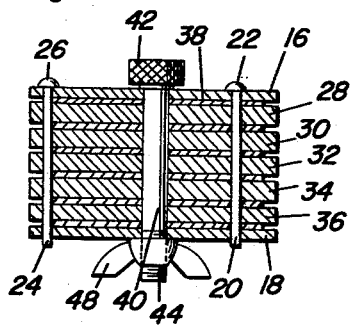
Arthur Dungan
INVENTOR.

United States Patent Office 3,045,348
Patented July 24, 1962

3,045,348
MEAT TENDERIZER
Arthur Dungan, P.O. Box 234, Mamoth, Ariz.
Filed Oct. 5, 1960, Ser. No. 60,704
6 Claims. (Cl. 30—304)

This invention relates to a scoring or cutting knife device which is especially useful for tenderizing of meat or the like.

It is therefore a primary object of this invention to provide a scoring device which while primarily useful in tenderizing meat may also be used to score or cut any type of food or substance such as the surfaces of pies, rolls, etc. before baking and for marking baked hams and for cutting parallel lines in any other type of food or substances.

Another object of this invention is to provide a scoring knife device which includes a plurality of cutting blades which are retractible within the knife device when it is not in use and are also adjustable within limits for cutting a desired depth.

A further object of this invention is to provide a scoring knife device which is extremely economical in construction and manufacture and which utilizes the conventional type of double edge safety razor blades which may accordingly be replaced to thereby avoid the sharpening of blades and the expense of replacing specially designed knife blades.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view illustrating the scoring knife device made in accordance with this invention.

FIGURE 2 is a front elevational view of the cutting head portion of the scoring knife device illustrated in FIGURE 1.

FIGURE 3 is a side elevational view of the cutting head portion of the scoring knife device illustrated in FIGURE 1 showing the blade adjusted to maximum cutting depth.

FIGURE 4 is a side elevational view similar to that of FIGURE 3 but showing the blade in retracted position.

FIGURE 5 is a sectional view taken through a plane indicated by section line 5—5 in FIGURE 4.

Referring to the drawings in detail, FIGURE 1 illustrates the scoring knife device with the blades thereof extended to a cutting position, said scoring knife device being generally indicated by the reference numeral 10. The scoring knife device includes a cutting head portion generally indicated by reference numeral 12 and a handle portion 14.

Referring to FIGURE 5 in particular, it will be observed that the cutting head portion 12 includes a pair of spaced end mounting plates 16 and 18. Extending between the mounting plates 16 and 18 is a pivot pin 20 having a head 22 abutting against the mounting end plate 16. As more clearly seen in FIGURES 1, 3 and 4, the pivot pin 20 is disposed centrally between the top and bottom edge of the mounting end plates 16 and 18 adjacent one side thereof. Disposed adjacent the other side of the end mounting plates 16 and 18 and also located closer to the upper edges thereof is a limit pin 24 which has a head 26 abutting against the mounting plate 16 as more clearly seen in FIGURE 5. It will therefore be observed that the pins 20 and 24 extend between the mounting plates 16 and 18 through apertures in said plates 16 and 18 which are aligned with each other.

It will also be observed that the pins 20 and 24 extend through aligned apertures disposed within spacer plates 28, 30, 32, 34 and 36 as more clearly seen in FIGURES 1, 2 and 5. The handle portion 14, it will therefore be observed, is formed integral with the spacer plate 32 which is disposed intermediate between the end mounting plates 16 and 18 on the pins 20 and 24.

As will be apparent from FIGURES 2 and 5, a plurality of conventional type double edge safety razor blades 38 are disposed between the adjacent spacer plates and the end mounting plates 16 and 18. It will therefore be observed in FIGURES 1, 3 and 4 that the razor blades 38 are pivotally mounted on the pivot pin 20 so that the blades 38 may be pivotally adjusted about said pivot pin 20 in order to vary the cutting depth of the scoring knife device. The razor blades 38 being spaced from each other by means of the spacer plates will thereby score the surface being worked upon leaving a plurality of parallel lines. Accordingly, if it is meat that is being scored, said meat may be effectively tenderized by use of the tool being herein described. It will, however, be observed in FIGURES 3 and 4 that when the scoring knife device is not in use the razor blades may be withdrawn upwardly between the spacer plates and mounting plates 16 and 18 so as to avoid injury to the person. Therefore, the limit pin 24 is provided for abutting against the upper edge portion of the razor blades 38 when they are in their retracted position as illustrated in FIGURE 4.

It will, however, be observed that the blades 38 must be locked or clamped in any adjusted position for use or disuse as desired. Accordingly, an elongated bolt member 40 is provided, said bolt member having a head portion 42 and a threaded end portion 44. The bolt member 40 therefore extends between and through the end mounting plate 16 and the spacer plates 28, 30, 32, 34 and 36. The bolt member 40 therefore also extends through the central opening in the razor blades 38 and thereby carries the razor blades 38 on the shank of the bolt member 40. Accordingly, arcuate slots 46 as seen in FIGURES 1, 3 and 4 are provided in each of the spacer plates and the end mounting plates 16 and 18, said arcuate slots being in alignment with each other when the spacer plates and mounting plates are assembled on the pins 20 and 24. The arcuate slots 46 are therefore defined by arcs having a center of curvature coinciding with the axis of pin 20. Accordingly, the bolt member 40 may be pivotally displaced with respect to the pivot pin 20 in order to pivot the blades 38 carried thereon about the pivot pin 20 for adjusting the depth of cut of the blades between the maximum depth position illustrated in FIGURE 3 and the retracted position illustrated in FIGURE 4. The blades and bolt 40 may therefore be clamped in any pivotally adjusted position relative to the spacer plates and mounting plates by means of a wing nut 48 which when threadedly engaged with the threaded end portion 44 of the bolt 40 will clamp the blades 38, spacer plates and end mounting plates 16 and 18 between the head portion 42 and the wing nut 48.

From the foregoing description, operation and use of the scoring knife device will be apparent. It will therefore be observed that one of the important features of this device in addition to being a practical meat tenderizer is that the blades are retractible and adjustable. It will also be appreciated that the construction is such that firm support is provided for the relatively fragile type of safety razor blade usable with this device. Furthermore, by virtue of its construction the device may be manufactured with great economy making it available for all.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. An adjustable and retractible scoring knife device employing double edge type of flexible safety razor blades comprising mounting means, pivot means mounted on said mounting means, limit means mounted on said mounting means, a plurality of spacer means assembled in spaced relation on said pivot means and limit means in fixed alignment with said mounting means, the safety razor blades being pivotally mounted on said pivot means between said mounting means and adjacent spacer means, adjustable clamp means extending through said mounting means and spacer means for adjustable movement relative to said mounting means and spacer means with said blades thereon for pivotal movement of said blades about said pivot means to a limit position of the blades abutting but free from positive mechanical connection with said limit means in which position the blades are retracted and wholly confined between said spacer means and mounting means, and balanced elongated handle means aligned and rigidly connected to one end of a central one of said spacer means, said mounting means comprising a pair of spaced end plates carrying said pivot means and limit means therebetween and having aligned arcuate slots through which said adjustable clamp means extends for pivotal movement relative to said pivot means, said pivot means and limit means comprising spacer assembling and aligning pins disposed parallel to each other and extending through aligned apertures in said end plates.

2. The device as defined in claim 1 wherein each spacer means comprises a spacer plate having an arcuate slot and aperture in alignment with the slot and apertures on said end plates.

3. The device as defined in claim 2, wherein said clamp means comprises an elongated headed bolt extending through the arcuate slots in said end plates and through the arcuate slots in said plate elements, and a wing nut threadedly engaged with a threaded end of said bolt for clamping said blades in adjusted position relative to said end plates and spacer plates.

4. The device as defined in claim 3, wherein said handle means is formed integral with said central one of said spacer plates.

5. A scoring knife device wherein readily insertable and removable double-edge flexible safety razor blades provide the cutting knives comprising a pair of opposed correspondingly constructed spaced parallel end plates, a handle provided at an end thereof with an integral blade spacer plate aligned with and constituting an extension of said handle, additional spaced parallel spacer plates arranged to the left and right of said first named spacer plate and interposed between the same and said end plates, corresponding median portions of all of said plates having alignable arcuate bolt accommodating slots, a plate assembling and blade clamping bolt passing removably through said slots, a blade mounting and pivoting pin passing through holes provided therefor in all of said plates, and blade limit stop pin also passing through holes provided therefor in all of said plates.

6. The structure according to claim 5, and wherein the pivot pin is positioned adjacent to the juncture of the handle and first named spacer plate, is parallel to but spaced rearwardly from said bolt and in a plane with the plane of the bolt, said limit stop pin is parallel to the pivot pin and bolt, is forwardly therefrom and is in a plane above the plane of the bolt.

References Cited in the file of this patent

UNITED STATES PATENTS

| | | |
|---|---|---|
| 172,739 | Hoffman | Jan. 25, 1876 |
| 1,991,546 | Czapar | Feb. 19, 1935 |
| 2,197,650 | Piper et al. | Apr. 16, 1940 |
| 2,264,960 | Vinton | Dec. 2, 1941 |

FOREIGN PATENTS

| | | |
|---|---|---|
| 267,554 | Switzerland | June 16, 1950 |
| 784,300 | France | Apr. 29, 1935 |